(12) United States Patent
Yamagata et al.

(10) Patent No.: US 10,495,963 B2
(45) Date of Patent: Dec. 3, 2019

(54) LIGHT SOURCE DEVICE AND PROJECTION DISPLAY APPARATUS

(71) Applicant: Panasonic Intellectual Property Management Co., Ltd., Osaka (JP)

(72) Inventors: Yuki Yamagata, Osaka (JP); Hiroki Sugiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/191,498

(22) Filed: Nov. 15, 2018

(65) Prior Publication Data

US 2019/0171096 A1    Jun. 6, 2019

(30) Foreign Application Priority Data

Dec. 6, 2017    (JP) .................................. 2017-233997
Sep. 13, 2018    (JP) .................................. 2018-171032

(51) Int. Cl.
*G03B 21/20*    (2006.01)
*H04N 9/31*    (2006.01)

(52) U.S. Cl.
CPC ..... *G03B 21/2066* (2013.01); *G03B 21/2013* (2013.01); *G03B 21/2033* (2013.01); *H04N 9/3164* (2013.01)

(58) Field of Classification Search
CPC ............ G03B 21/2013; G03B 21/2066; G03B 21/2033; H04N 9/3161; H04N 9/3164
See application file for complete search history.

(56) References Cited

U.S. PATENT DOCUMENTS

2015/0029467 A1*    1/2015    Sugiyama ............ H04N 9/3161
                                              353/31
2015/0185598 A1*    7/2015    Wang .................. G03B 21/2033
                                              353/20

FOREIGN PATENT DOCUMENTS

| DE | 102011087184 A1 * | 5/2013 | ......... G03B 21/2013 |
| JP | 2000-304908 | 11/2000 | |
| JP | 2000-347589 | 12/2000 | |
| JP | 2002-244211 | 8/2002 | |
| JP | 2014-178693 | 9/2014 | |
| JP | 2016-109849 | 6/2016 | |

* cited by examiner

*Primary Examiner* — Ryan D Howard
(74) *Attorney, Agent, or Firm* — Wenderoth, Lind & Ponack, L.L.P.

(57) ABSTRACT

A light source device includes first and second laser light source units, a first reflective member, and a returning reflective member. The first and second laser light source units are disposed face-to-face, each of the first and the second laser light source units comprising a plurality of laser light sources arranged in an array. The first reflective member is disposed diagonally with respect to the light emitted from the first and second laser light source units, the first reflective member reflecting the light. The returning reflective member reflects the light emitted from the second laser light source unit and reflected by the first reflective member. The light emitted from the first laser light source unit and reflected by the first reflective member is parallel to, and in a same direction of travel as, the light emitted from the second laser light source unit and reflected by the returning reflective member.

15 Claims, 12 Drawing Sheets

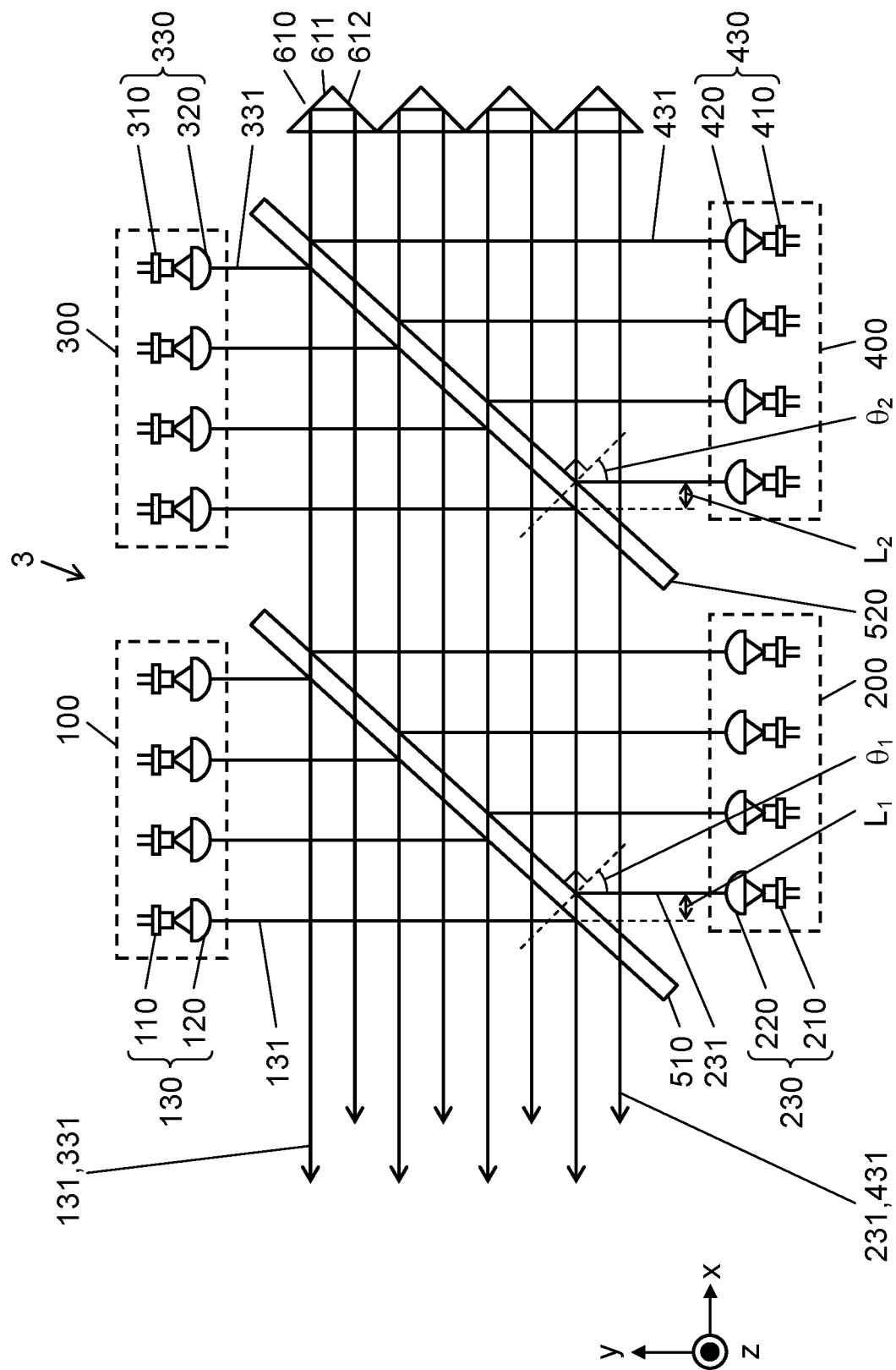

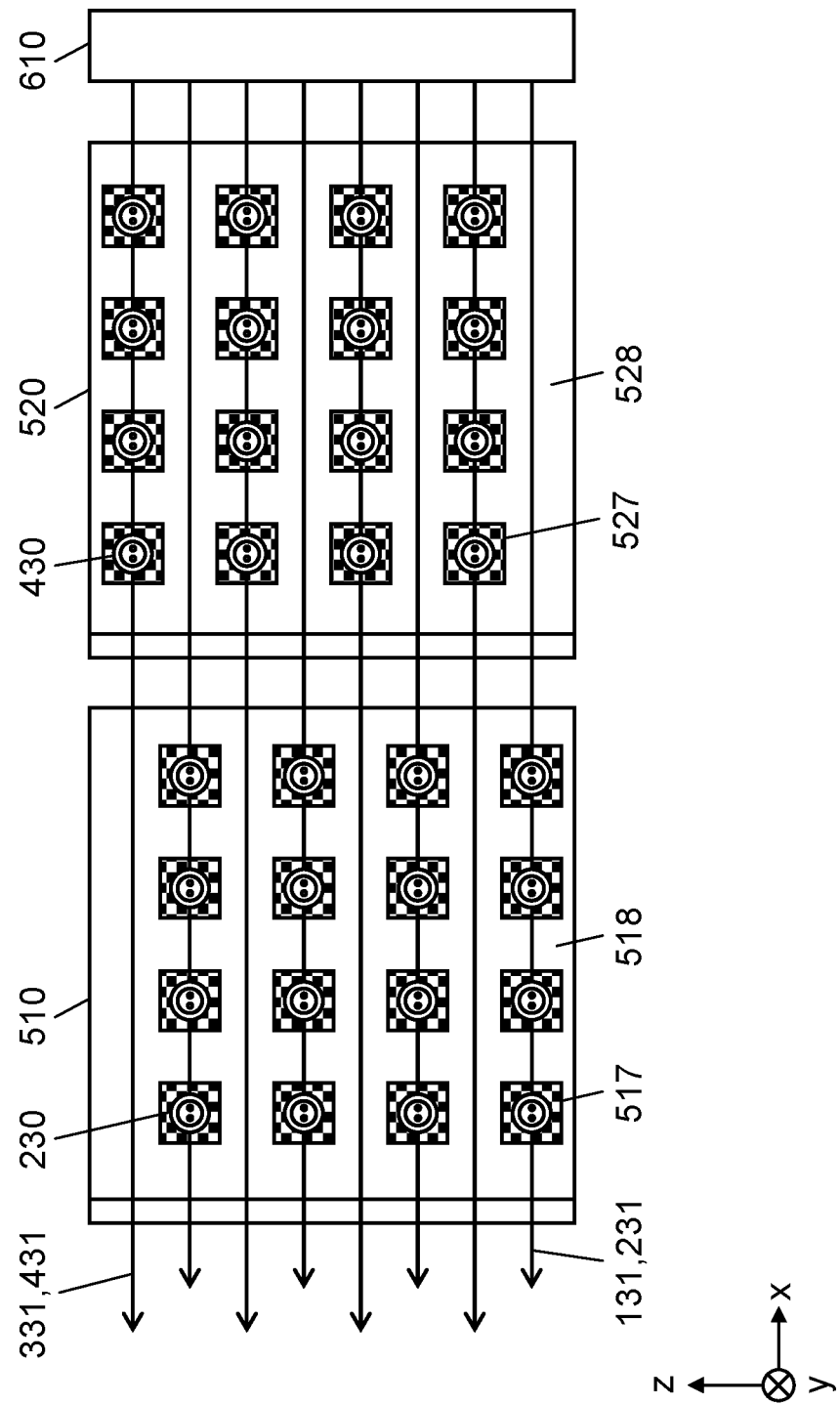

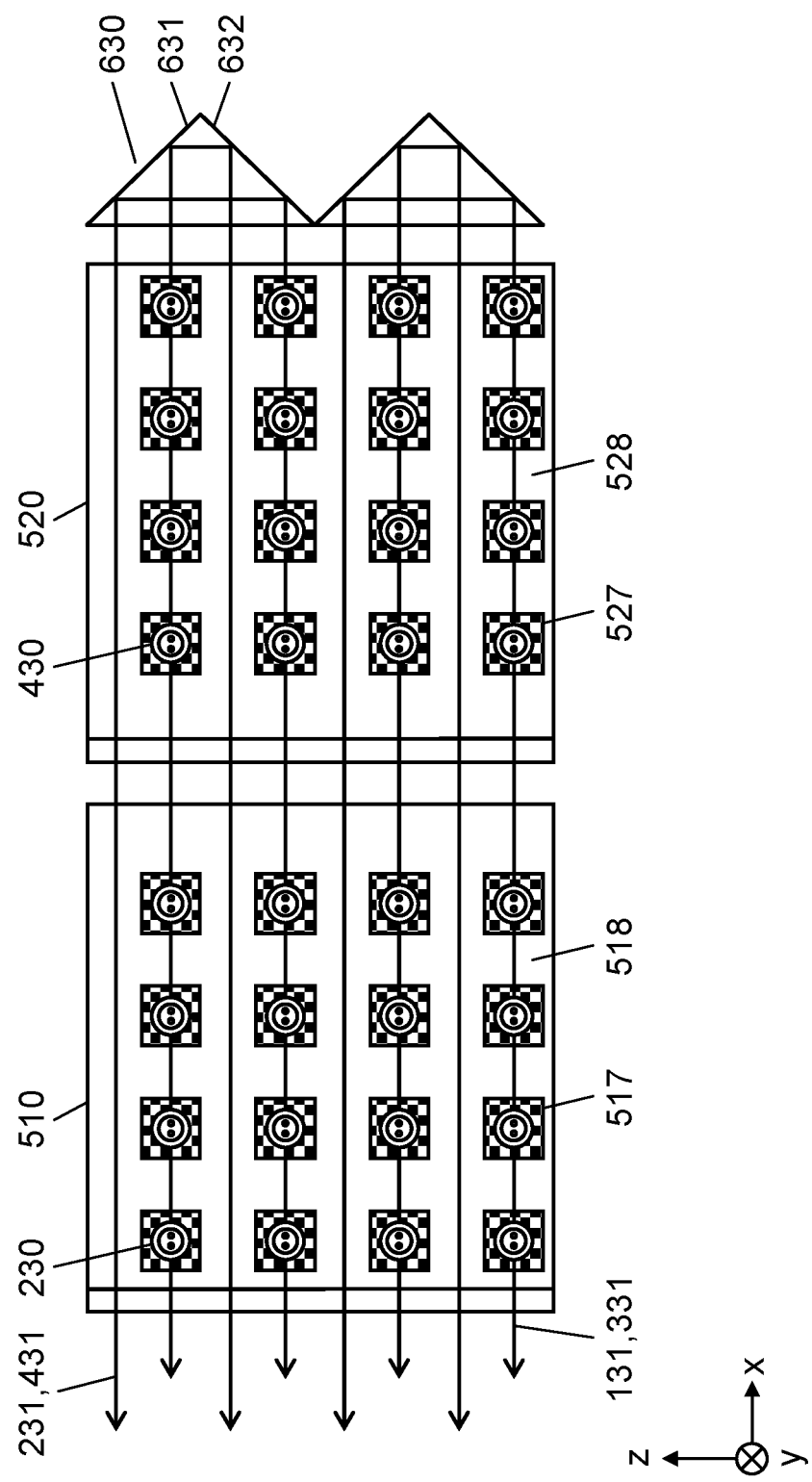

LIGHT SOURCE DEVICE AND PROJECTION DISPLAY APPARATUS

BACKGROUND

1. Technical Field

The present disclosure relates to a light source device reduced in size by arranging light fluxes from a plurality of laser light sources at high density in a simple structure. The disclosure also relates to a projection display apparatus including the light source device.

2. Description of the Related Art

Along with advances in solid-state light source technology, discharge tube lamps used as light sources in projection display apparatuses are being replaced by LEDs and semiconductor lasers, which have advantageous features such as being long-lived, mercury-free, and non-explosive. Each semiconductor laser has a low light output, but the light output has a comparatively small etendue. Because of this feature, semiconductor lasers arranged in an array are often used as light sources. Even projectors with an output of 5000 lumens or more are now commercially available.

Lasers are typically stored in cylindrical packages. In such a package, lasers are arranged at regular intervals two dimensionally so that they can be prevented from being heated over a predetermined temperature to protect their outputs and lives.

Patent Literature 1 (Japanese Unexamined Patent Application Publication No. 2000-347589) shows a lighting apparatus for projectors. In this apparatus, two lamps are arranged in different directions. The light flux from each of the lamps is made to pass through a reflector and a lens array and is separated into a plurality of light fluxes. The light fluxes from the two lamps are combined by a mirror having reflective regions and transmissible regions arranged alternately. Meanwhile, Patent Literature 2 (Japanese Unexamined Patent Application Publication No. 2002-244211) shows a lighting technique for an image projection apparatus. In this apparatus, a wavelength-selective mirror combines light fluxes with different wavelengths emitted from a plurality of laser light source arrays into light that propagates in one direction.

SUMMARY

The present disclosure provides a light source device that includes laser modules disposed face-to-face, each composed of laser light sources arranged in an array. The light source device is cost effective because it has a simple and compact structure composed of comparatively inexpensive components. The present disclosure further provides a projection display apparatus including the light source device.

A first light source device of the present disclosure includes first and second laser light source units, a first reflective member, and a returning reflective member. The first and second laser light source units are disposed face-to-face, each of the first and the second laser light source units comprising a plurality of laser light sources arranged in an array. The first reflective member is configured to be disposed diagonally with respect to the light emitted from the first and second laser light source units, the first reflective member being configured to reflect the light. The returning reflective member is configured to reflect the light that is emitted from the second laser light source unit and is reflected by the first reflective member. The light emitted from the first laser light source unit and reflected by the first reflective member is parallel to, and in a same direction of travel as, the light emitted from the second laser light source unit and reflected by the returning reflective member.

A second light source device of the present disclosure includes first to fourth laser light source units, first and second reflective members, and a returning reflective member. The first and second laser light source units are disposed face-to-face, each of the first and the second laser light source units comprising a plurality of laser light source arranged in an array. The first reflective member is disposed diagonally with respect to the light emitted from the first and second laser light source units, the first reflective member being configured to reflect the light. The third and fourth laser light source units are disposed face-to-face, each of the third and the fourth laser light source units includes a plurality of laser light source arranged in an array. The second reflective member is diagonally with respect to the light emitted from the third and fourth laser light source units, the second reflective member being configured to reflect the light. The returning reflective member reflects the light that is emitted from the second laser light source unit and is reflected by the first reflective member, and the light that is emitted from the fourth laser light source unit and is reflected by the second reflective member. The following types of light are parallel to one another and in an identical direction of travel: the light emitted from the first laser light source unit and reflected by the first reflective member; the light emitted from the second laser light source unit and reflected by the returning reflective member; the light emitted from the third laser light source unit and reflected by the second reflective member; and the light emitted from the fourth laser light source unit and reflected by the returning reflective member. The second reflective member is disposed on a path of the light from the first reflective member to the returning reflective member, the light being emitted from the second laser light source unit.

The projection display apparatus of the present disclosure includes the first or second light source device.

The present disclosure is effective to achieve a light source device that includes laser modules disposed face-to-face, each composed of laser light sources arranged in an array. The light source device is cost effective because it has a simple and compact structure composed of comparatively inexpensive components. The present disclosure is also effective to achieve a projection display apparatus including the light source device.

BRIEF DESCRIPTION OF DRAWINGS

FIG. 3A is a top view of a light source device according to a third exemplary embodiment;

FIG. 3B is a side view of the light source device according to the third exemplary embodiment;

FIG. 4B is a side view of the light source device according to the fourth exemplary embodiment;

DETAILED DESCRIPTION

Exemplary embodiments will be described in detail as follows with reference to the accompanying drawings. However, the description of well-known matter and of substantially the same configuration as described earlier may be omitted to avoid redundancy and help those skilled in the art understand them easily.

Note that the attached drawings and the following description are provided to make those skilled in the art fully understand the present disclosure and are not intended to limit the claimed subject matter.

First Exemplary Embodiment

Figure 1A:
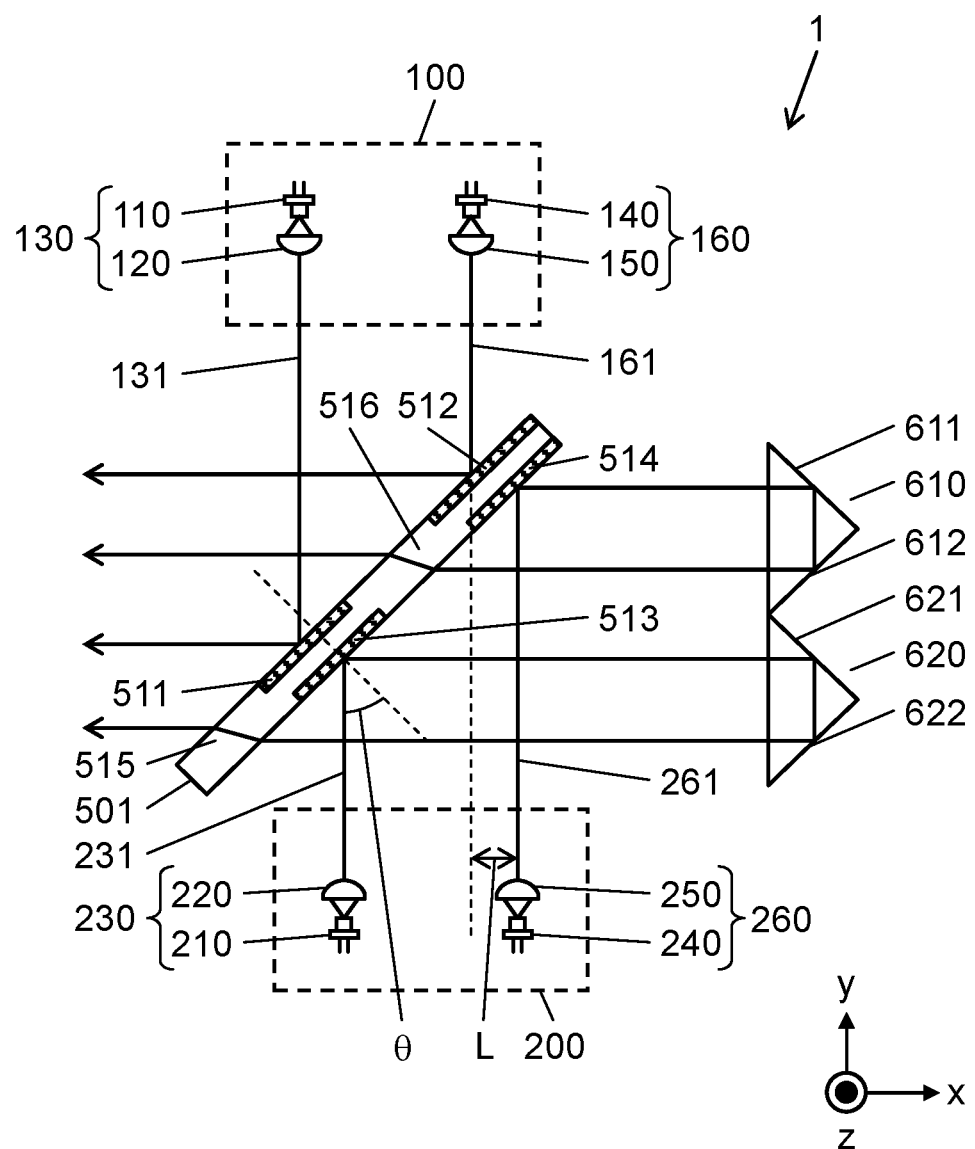
FIG. 1A is a top view of a light source device according to a first exemplary embodiment.
Figure 1B:
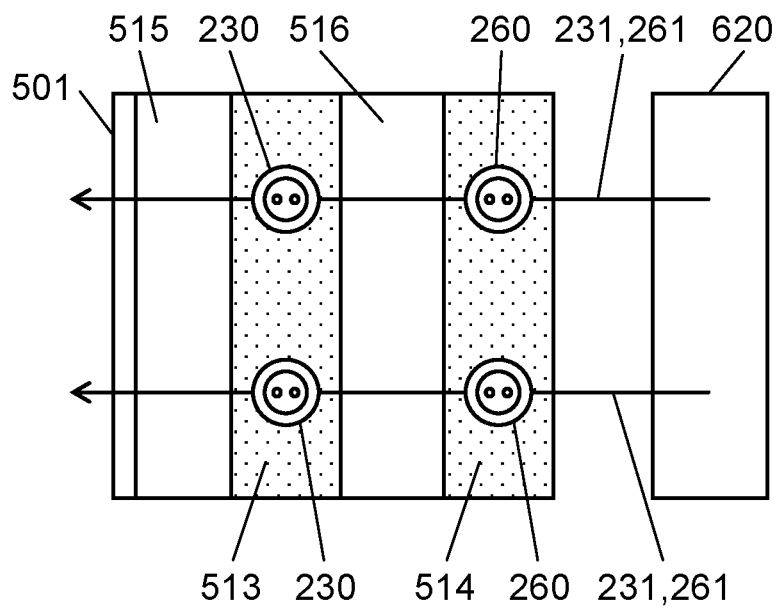
FIG. 1B is a side view of the light source device according to the first exemplary embodiment.
Figure 1C:
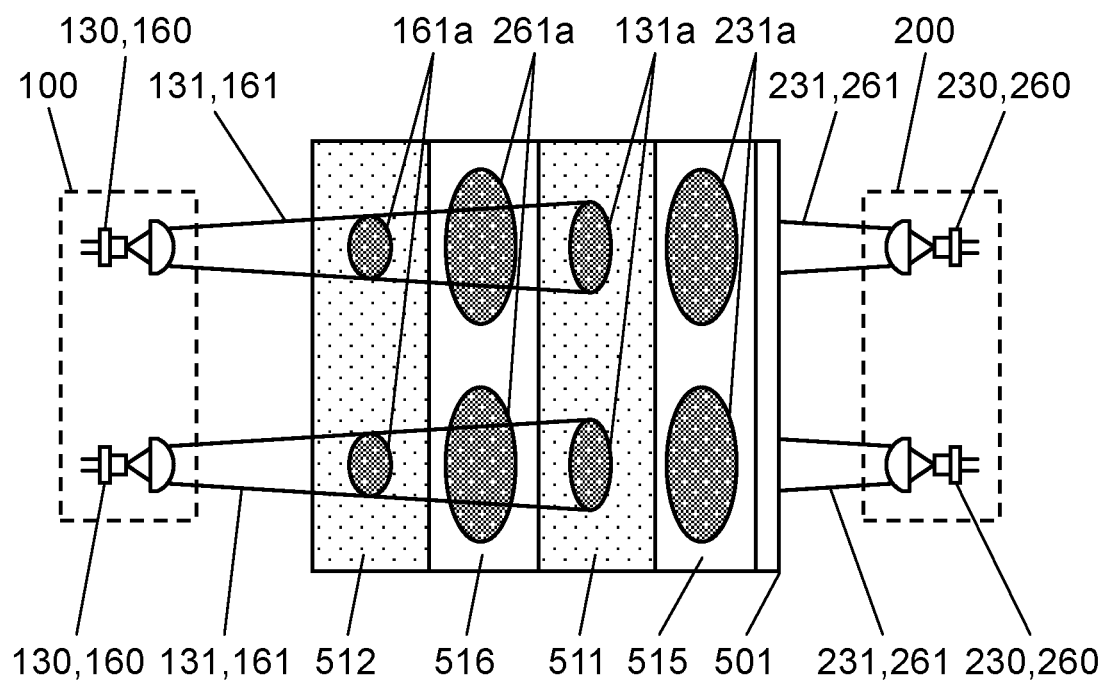
FIG. 1C shows the images of light fluxes in a front view of the light source device according to the first exemplary embodiment.

FIGS. 1A to 1C show the configuration of light source device 1 of the first exemplary embodiment. FIG. 1A shows the configuration of device 1 seen in the negative z direction. FIG. 1B shows the configuration of device 1 seen in the y direction of FIG. 1A. FIG. 1C shows the images of light fluxes when device 1 is seen in the x direction of FIG. 1A.

In FIG. 1A, light source device 1 includes first laser light source unit 100, second laser light source unit 200, first reflective mirror 501, first prism 610 with two reflection planes: first reflection plane 611 and second reflection plane 612 at right angles to each other, and second prism 620 with two reflection planes: first reflection plane 621 and second reflection plane 622 at right angles to each other. First reflective mirror 501 is an example of the first reflective member. First prism 610 and second prism 620 are examples of the returning reflective member with two reflection planes: a first reflection plane and a second reflection plane at right angles to each other.

First laser light source unit 100 includes two semiconductor laser light sources 130 each including semiconductor laser device 110 and collection lens 120, and two semiconductor laser light sources 160 each including semiconductor laser device 140 and collection lens 150. Light sources 130 and 160 are arranged in a two dimensional (hereinafter, 2-D), 2×2 array at regular intervals (at an equal pitch in the x and z directions).

Second laser light source unit 200 includes two semiconductor laser light sources 230 each including semiconductor laser device 210 and collection lens 220, and two semiconductor laser light sources 260 each including semiconductor laser device 240 and collection lens 250. Light sources 230 and 260 are arranged in a 2-D, 2×2 array at regular intervals (at the same pitch as in first laser light source unit 100).

Thus, first laser light source unit 100 and second laser light source unit 200 have substantially the same arrangement of semiconductor laser light sources. Units 100 and 200 are disposed face-to-face in the positive and negative y directions in which their light propagates.

The light with divergence angle emitted from semiconductor laser devices 110, 140 of first laser light source unit 100 is collected by collection lenses 120, 150 and then converted to approximately parallel light fluxes 131, 161.

The light with divergence angle emitted from semiconductor laser devices 210, 240 of second laser light source unit 200 is collected by collection lenses 220, 250, and then converted to approximately parallel light fluxes 231, 261.

Light fluxes 131, 161 that have passed through collection lenses 120, 150 and light fluxes 231, 261 that have passed through collection lenses 220, 250 have a divergence angle in the x and z directions. Semiconductor laser devices 110, 140, 210, and 240 are disposed such that the divergence angle is larger in the z direction than in the x direction.

First laser light source unit 100 and second laser light source unit 200 are disposed face-to-face as shown in FIG. 1A such that the optical axes of light sources 130 and 160 are displaced from the optical axes of light sources 230 and 260 by a distance L in the x direction. The distance L satisfies Formula 1 below.

$$L = t\left(\cos\theta - \frac{1}{\sqrt{n^2 - \sin^2\theta}}\sin^2\theta\right) \quad \text{Mathematical Formula 1}$$

wherein t represents the thickness of first reflective mirror 501, θ represents the incident angle of the light fluxes on mirror 501, and n represent the refractive index of mirror 501.

First reflective mirror 501 is disposed diagonally (at an incidence angle of 45° in the present exemplary embodiment) with respect to the light emitted from first and second laser light source units 100, 200. Mirror 501 has reflective regions 511, 512, 513, and 514 at which incident light is reflected, and transmissible regions 515 and 516, which allow incident light to pass through them. Reflective regions 511, 512, 513, and 514 straddle the optical axes of semiconductor laser devices 110, 140, 210, and 240, respectively.

First laser light source unit 100 emits light fluxes 131 and 161. Light fluxes 131 and 161 are reflected at reflective regions 511 and 512, respectively, of first reflective mirror 501.

Second laser light source unit 200 emits light fluxes 231, which are reflected at reflective region 513 of first reflective mirror 501 and strike second prism 620. The light fluxes incident on prism 620 are reflected twice in prism 620, namely, by first reflection plane 621 and second reflection plane 622. The incident light fluxes are reflected such that their optical axes are parallelly displaced in the y direction to the positions passing through transmissible region 515 of first reflective mirror 501. After being reflected by prism 620, light fluxes 231 pass through transmissible region 515 of first reflective mirror 501.

Second laser light source unit 200 emits light fluxes 261, which are reflected at reflective region 514 of first reflective mirror 501 and strike first prism 610. The light fluxes incident on prism 610 are reflected twice in prism 610, namely, by first reflection plane 611 and second reflection plane 612. The incident light fluxes are reflected such that their optical axes are parallelly displaced in the y direction to the positions passing through transmissible region 516 of first reflective mirror 501. After being reflected by prism 610, light fluxes 261 pass through transmissible region 516 of first reflective mirror 501.

After passing through mirror 501, light fluxes 231 and 261 are displaced in the negative y direction from light fluxes 131 and 161 that have been emitted from first laser light source unit 100 and reflected at reflective regions 511 and 512 of mirror 501 by half of the pitch at which semiconductor laser light sources 130, 160, 230, and 260 are arranged. In other words, some of the light fluxes emitted from second laser light source unit 200 are disposed between some of the optical paths of the light fluxes emitted from unit 100.

Thus, the light fluxes emitted from first laser light source unit 100 and the light fluxes emitted from second laser light source unit 200 are combined such that the optical paths of the light fluxes emitted from unit 200 are displaced from the optical paths of the light fluxes emitted from unit 100 by a half pitch. As a result, the light fluxes emitted from light source device 1 have twice the density of the light fluxes emitted from one laser light source unit.

Light fluxes 231 and 261 emitted from second laser light source unit 200 are reflected at reflective regions 513, 514 of first reflective mirror 501 and by prisms 610, 620, and pass through transmissible regions 515, 516 of first reflective mirror 501. Light fluxes 231 and 261 may have spot shapes 231a and 261a with a large diameter in the y direction when passing through transmissible regions 515 and 516 of first reflective mirror 501 shown in FIG. 1C. In this case, light fluxes 231 and 261 may be subject to vignetting at the ends of reflective regions 513 and 514 or at the end of mirror 501. In FIG. 1C, reflective region 511 has spot shapes 131a, which represent the spot shapes of light fluxes 131, and reflective region 512 has spot shapes 161a, which represent the spot shapes of light fluxes 161.

In the present exemplary embodiment, transmissible regions 515 and 516 of first reflective mirror 501 are long in the z direction. Accordingly, semiconductor laser devices 210 and 240 are disposed such that light fluxes 231 and 261 emitted from second laser light source unit 200 have a larger divergence angle in the z direction than in the x direction. As a result, when light fluxes 231 and 261 strike transmissible regions 515 and 516, respectively, their spot shapes 231a and 261a are oval long in the z direction and short in the y direction. This prevents light fluxes 231 and 261 from being subject to vignetting at the ends of reflective regions 513 and 514 or at the end of first reflective mirror 501.

Second Exemplary Embodiment

Figure 2A:
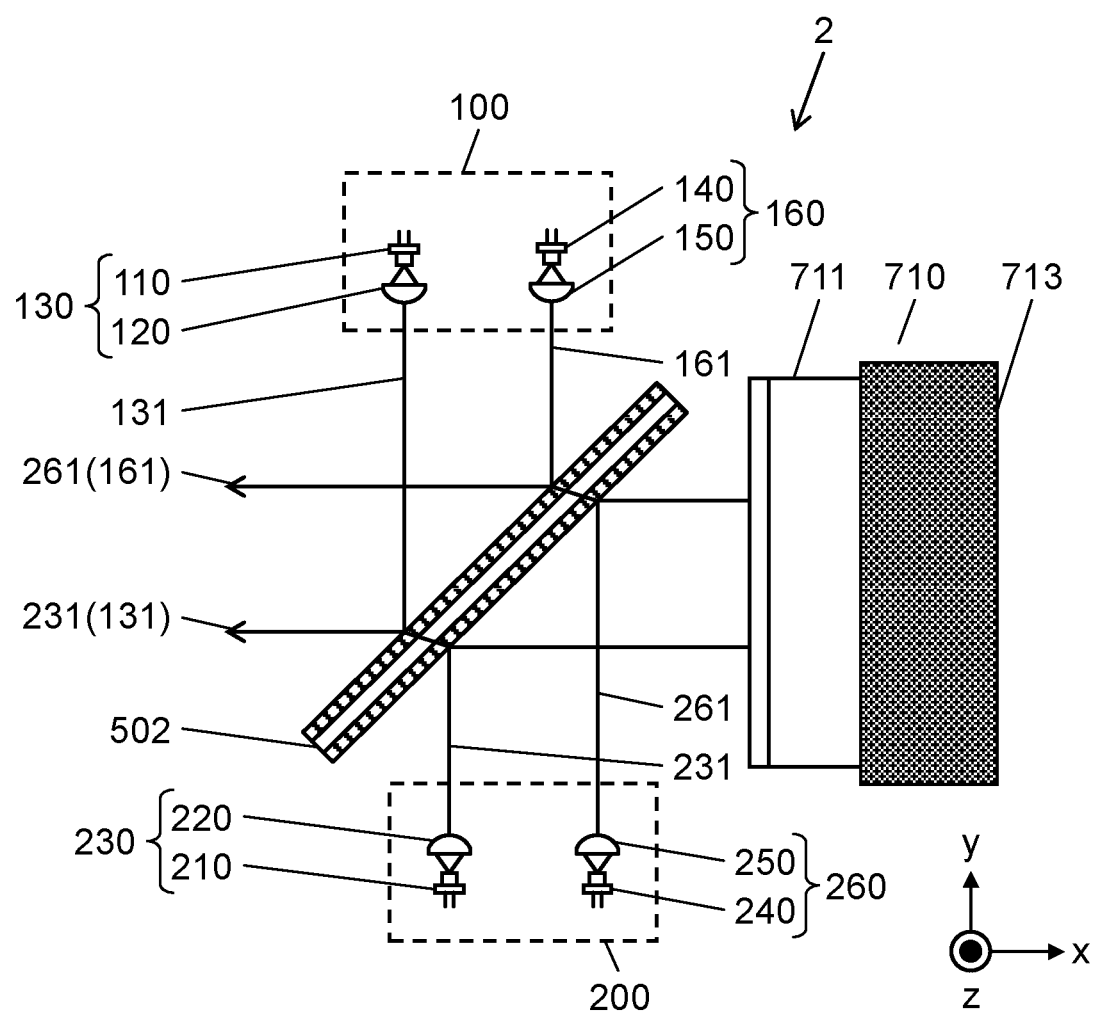
FIG. 2A is a top view of a light source device according to a second exemplary embodiment.
Figure 2B:
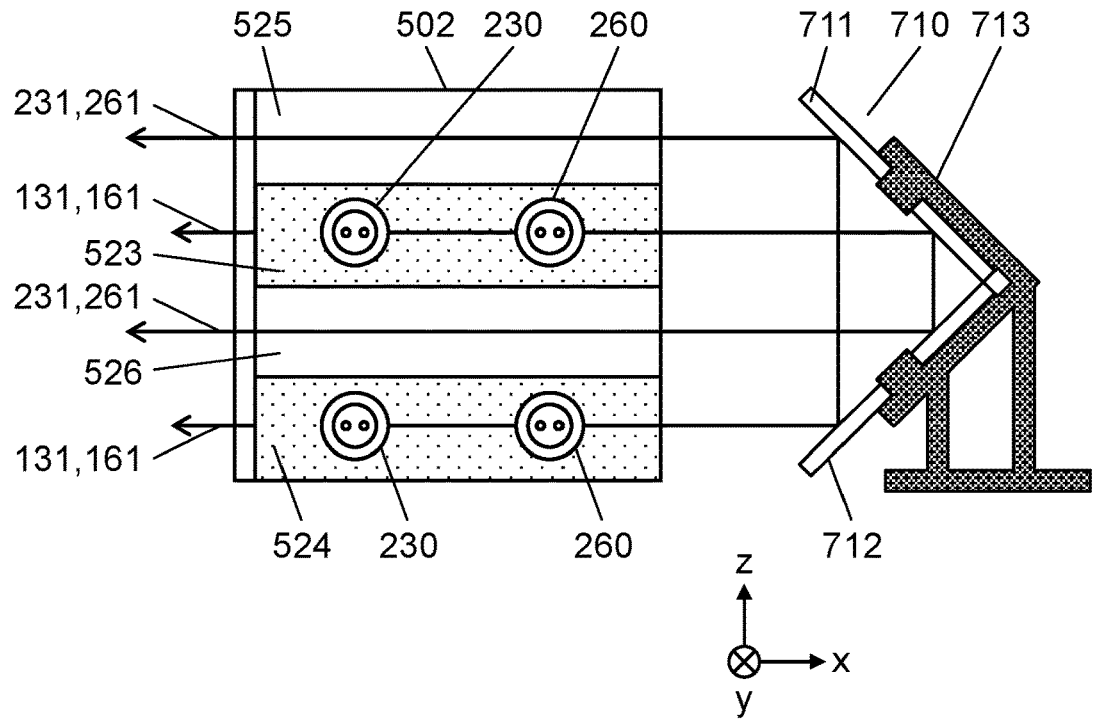
FIG. 2B is a right-side view of the light source device according to the second exemplary embodiment.
Figure 2C:
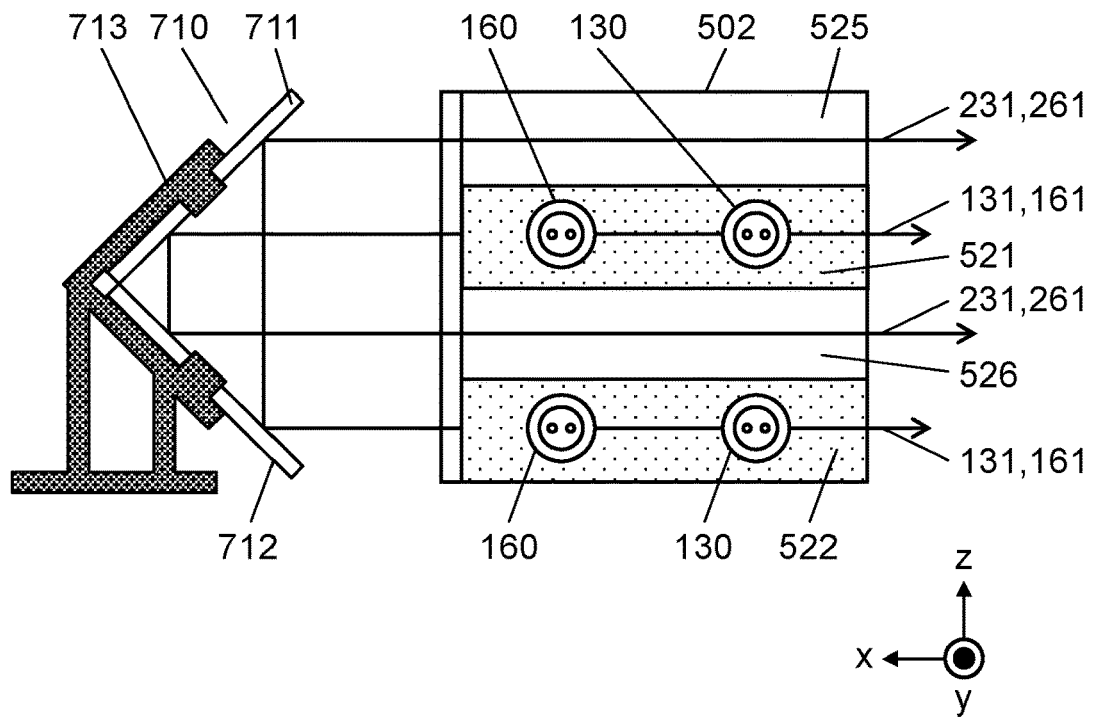
FIG. 2C is a left-side view of the light source device according to the second exemplary embodiment.
Figure 2D:
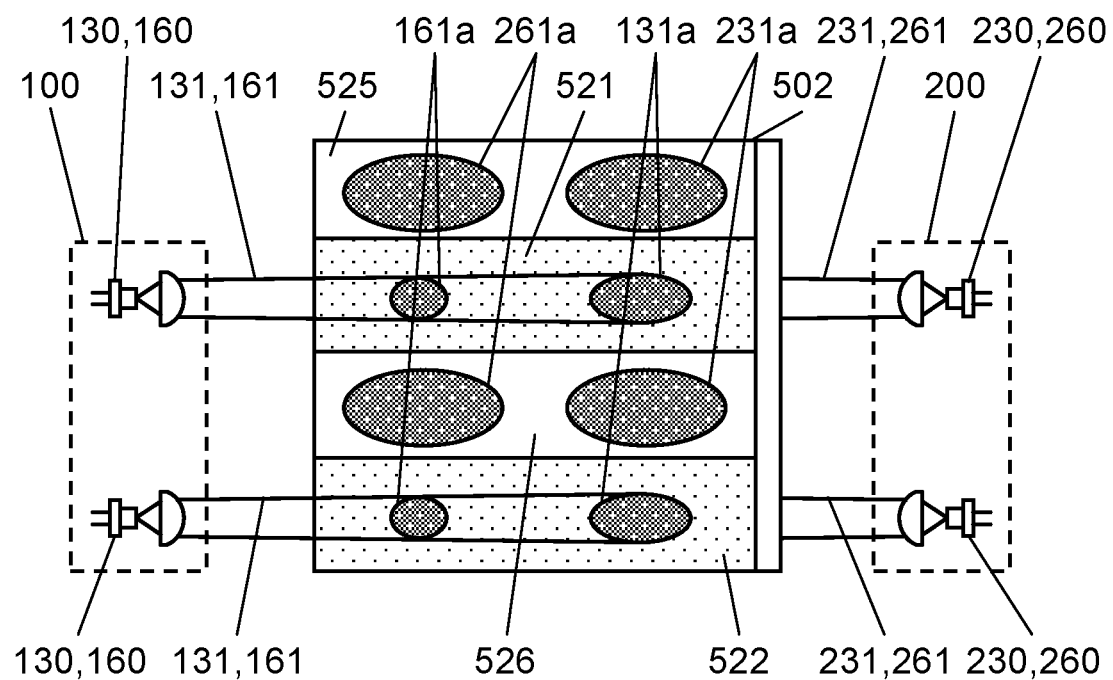
FIG. 2D shows the images of light fluxes in a front view of the light source device according to the second exemplary embodiment.

FIGS. 2A to 2D show the configuration of light source device 2 of the second exemplary embodiment. FIG. 2A shows the configuration of device 2 seen in the negative z direction. FIG. 2B shows the configuration of device 2 seen in the y direction of FIG. 2A. FIG. 2C shows the configuration of device 2 seen in the negative y direction of FIG. 2A. FIG. 2D shows the images of light fluxes when device 2 is seen in the x direction of FIG. 2A. In FIGS. 2A to 2D, like components are labeled with like reference numerals with respect to the first exemplary embodiment.

In FIG. 2A, light source device 2 includes first laser light source unit 100, second laser light source unit 200, first reflective mirror 502, and returning reflective mirror 710. Returning reflective mirror 710 includes first reflective mirror 711, second reflective mirror 712, and retention mechanism 713 for holding these mirrors 711 and 712 at right angles to each other. First reflective mirror 502 is an example of the first reflective member. Returning reflective mirror 710 is an example of the returning reflective member composed of two mirrors and a mechanism for holding the mirrors at right angles to each other.

Like the first exemplary embodiment, each of first and second laser light source units 100, 200 includes four semiconductor laser light sources arranged in a 2-D, 2×2 array at regular intervals (at an equal pitch). Unit 100 and unit 200 are disposed face-to-face in the positive and negative y directions in which their light propagates.

Light fluxes 131 and 161 emitted from first laser light source unit 100 and light fluxes 231 and 261 emitted from second laser light source unit 200 have a divergence angle in the x and z directions. However, considering the orientation of the reflective regions and transmissible regions of first reflective mirror 502, which will be described later, the semiconductor laser devices 110, 140, 210, and 240 are disposed such that the divergence angle is larger in the x direction than in the z direction in the present exemplary embodiment, unlike in the first exemplary embodiment.

First reflective mirror 502 is disposed diagonally (at an incidence angle of 45° in the present exemplary embodiment) with respect to the light emitted from first and second laser light source units 100, 200. Mirror 502 has reflective regions 521, 522, 523, and 524 at which incident light is reflected, and transmissible regions 525 and 526, which allow incident light to pass through them. Reflective regions 521, 522, 523, and 524 straddle the optical axes of semiconductor laser devices 110, 140, 210, and 240, respectively. Transmissible region 525 is located on the positive z side of first reflective mirror 502 and between reflective regions 521, 523 and the end of first reflective mirror 502. Transmissible region 526 is located on the negative z side of first reflective mirror 502 and between reflective regions 521, 523 and reflective regions 522, 524.

Light fluxes 131 and 161 emitted from first laser light source unit 100 are reflected at reflective regions 521 and 522 of first reflective mirror 502 and emitted in the negative x direction as shown in FIGS. 2C and 2D.

Light fluxes 231 and 261 from second laser light source unit 200 are reflected at reflective regions 523 and 524 of first reflective mirror 502 and strike returning reflective mirror 710 as shown in FIG. 2B. Light fluxes 231 and 261 incident on mirror 710 are reflected twice in mirror 710, namely by first reflective mirror 711 and second reflective mirror 712. Thus, the incident light fluxes 231 and 261 are reflected such that their optical axes are parallelly displaced in the z direction to the positions passing through transmissible regions 525 and 526, respectively, of first reflective mirror 502. After being reflected by mirror 710, light fluxes 231 and 261 pass through transmissible regions 525 and 526, respectively, of first reflective mirror 502.

To be more specific, light fluxes 231 and 261 from semiconductor laser light sources 230 and 260 disposed on the positive z side of second laser light source unit 200 are displaced in the negative z direction by mirror 710 and pass through transmissible region 526 on the negative z side of first reflective mirror 502. Similarly, light fluxes 231 and 261 from semiconductor laser light sources 230 and 260 disposed on the negative z side of unit 200 are displaced in the positive z direction by mirror 710 and pass through transmissible region 525 on the positive z side of mirror 502.

As shown in FIG. 2C, after passing though transmissible region 525 of first reflective mirror 502, light fluxes 231 and 261 are displaced from light fluxes 131 and 161 reflected at reflective region 521 in the positive z direction by half of the pitch at which semiconductor laser light sources 130, 160, 230, and 260 are arranged. Similarly, after passing through transmissible region 526 of first reflective mirror 502, light fluxes 231 and 261 are displaced from light fluxes 131 and 161 reflected at reflective region 522 in the positive z direction by a half pitch. In other words, light fluxes 231 and 261 that have passed through transmissible region 526 of first reflective mirror 502 are disposed between the light fluxes 131, 161 reflected at reflective region 521 and the light fluxes 131, 161 reflected at reflective region 522 in the z direction.

Thus, the light fluxes emitted from first laser light source unit 100 and the light fluxes emitted from second laser light source unit 200 are combined such that the optical paths of the light fluxes emitted from unit 200 are displaced from the optical paths of the light fluxes emitted from unit 100. As a result, the light fluxes emitted from light source device 1 have twice the density of the light fluxes emitted from one laser light source unit.

After being reflected at first reflective mirror 502 and returning reflective mirror 710, light fluxes 231 and 261 emitted from second laser light source unit 200 pass through transmissible region 525 flanked by the end of mirror 502 and reflective regions 521, 523 and pass through transmissible region 526 flanked by reflective regions 521, 523 and reflective regions 522, 524. While passing through first reflective mirror 502, light fluxes 231 and 261 may have spot shapes 231a and 261a that are long in the z direction as shown in FIG. 2D. In this case, light fluxes 231 and 261 may be subject to vignetting at the ends of reflective regions 521 to 524 or at the end of first reflective mirror 502. In FIG. 2D, spot shapes 131a and 161a of reflective regions 521 and 522 represent the spot shapes of light fluxes 131 and 161, respectively.

In the present exemplary embodiment, transmissible regions 525 and 526 of first reflective mirror 502 are short in the z direction. Accordingly, semiconductor laser devices 210 and 240 are disposed such that light fluxes 231 and 261 emitted from second laser light source unit 200 have a larger divergence angle in the x direction than in the z direction. As a result, when light fluxes 231 and 261 strike transmissible regions 525 and 526, respectively, their spot shapes 231a and 261a are oval long in the y direction and short in the z direction. This prevents light fluxes 231 and 261 from being subject to vignetting at the ends of reflective regions 521 to 524 or at the end of first reflective mirror 502.

Third Exemplary Embodiment

FIGS. 3A and 3B show the configuration of light source device 3 of the third exemplary embodiment. FIG. 3A shows the configuration of device 3 seen from above. FIG. 3B shows the configuration of device 3 seen from a side (in the y direction of FIG. 3A). In FIGS. 3A and 3B, like components are labeled with like reference numerals with respect to the first exemplary embodiment.

In FIG. 3A, light source device 3 includes first laser light source unit 100, second laser light source unit 200, third laser light source unit 300, fourth laser light source unit 400, first reflective mirror 510, second reflective mirror 520, and first prisms 610, each with two reflection planes: first reflection plane 611 and second reflection plane 612 at right angles to each other. First reflective mirror 510 is an example of the first reflective member. Second reflective mirror 520 is an example of the second reflective member. First prisms 610 are an example of the returning reflective member with two reflection planes at right angles to each other. In the present exemplary embodiment, four first prisms 610 are disposed in the y direction.

First laser light source unit 100 is composed of 16 semiconductor laser light sources 130 arranged in a 2-D, 4×4 array at regular intervals (at an equal pitch). Each of light sources 130 is composed of semiconductor laser device 110 and collection lens 120.

Second laser light source unit 200 is composed of 16 semiconductor laser light sources 230 arranged in a 2-D, 4×4 array at regular intervals (at the same pitch as in first laser light source unit 100). Each of light sources 230 is composed of semiconductor laser device 210 and collection lens 220.

Thus, first and second laser light source units 100, 200 have substantially the same arrangement of the semiconductor laser light sources. Units 100 and 200 are disposed face-to-face in the positive and negative y directions in which their light propagates.

Third laser light source unit 300 is composed of 16 semiconductor laser light sources 330 arranged in a 2-D, 4×4 array at regular intervals (at the same pitch as in first laser light source unit 100). Each of light sources 330 is composed of semiconductor laser device 310 and collection lens 320.

Fourth laser light source unit 400 is composed of 16 semiconductor laser light sources 430 arranged in a 2-D, 4×4 array at regular intervals (at the same pitch as in first laser light source unit 100). Each of light sources 430 is composed of semiconductor laser device 410 and collection lens 420.

Thus, third and fourth laser light source units 300, 400 have substantially the same arrangement of the semiconductor laser light sources. Units 300 and 400 are disposed face-to-face in the positive and negative y directions in which their light propagates. Units 300 and 400 are displaced from first and second laser light source units 100, 200 in the z direction by half of the pitch at which the semiconductor laser light sources are arranged.

The light with divergence angle emitted from semiconductor laser devices 110 of first laser light source unit 100 is collected by collection lenses 120 and then converted to approximately parallel light fluxes 131.

The light with divergence angle emitted from semiconductor laser devices 210 of second laser light source unit 200 is collected by collection lenses 220 and then converted to approximately parallel light fluxes 231.

The light with divergence angle emitted from semiconductor laser devices 310 of third laser light source unit 300 is collected by collection lenses 320 and then converted to approximately parallel light fluxes 331.

The light with divergence angle emitted from semiconductor laser devices 410 of fourth laser light source unit 400 is collected by collection lenses 420 and then converted to approximately parallel light fluxes 431.

Light fluxes 131, 231, 331, and 431, after passing through collection lenses 120, 220, 320, and 420, respectively, have a divergence angle in the x and z directions. Semiconductor laser devices 110, 210, 310, and 410 are disposed such that the divergence angle is larger in the z direction than in the x direction.

First and second laser light source units 100, 200 are disposed face-to-face as shown in FIG. 3A such that the optical axes of light sources 330 are displaced from the optical axes of light sources 430 by a distance $L_1$ in the x direction. The distance $L_1$ satisfies Formula 2 below.

$$L_1 = t_1 \left( \cos\theta_1 - \frac{1}{\sqrt{n_1^2 - \sin^2\theta_1}} \sin^2\theta_1 \right) \quad \text{Mathematical Formula 2}$$

wherein $t_1$ represents the thickness of first reflective mirror 510, $\theta_1$ represents the incident angle of the light fluxes on mirror 510, and $n_1$ represents the refractive index of mirror 510.

Third and fourth laser light source unit 300, 400 are disposed face-to-face such that the optical axes of light sources 330 are displaced from the optical axes of light sources 430 by a distance $L_2$ in the x direction. The distance $L_2$ satisfies Formula 3 below.

$$L_2 = t_2\left(\cos\theta_2 - \frac{1}{\sqrt{n_2^2 - \sin^2\theta_2}}\sin^2\theta_2\right) \quad \text{Mathematical Formula 3}$$

wherein $t_2$ represents the thickness of second reflective mirror 520, $\theta_2$ represents the incident angle of the light fluxes on mirror 520, and $n_2$ represents the refractive index of mirror 520.

In the present exemplary embodiment, the following relations are satisfied: $t_1=t_2$, $\theta_1=\theta_2$, $n_1=n_2$, and $L_1=L_2$.

First reflective mirror 510 is disposed diagonally (at an incidence angle of 45° in the present exemplary embodiment) with respect to the light emitted from first and second laser light source units 100, 200. Mirror 510 has reflective regions 517 (the regions grayed in FIG. 3B and not shown in FIG. 3A) at which incident light is reflected, and transmissible regions 518, which allow incident light to pass through them. Reflective regions 517 straddle the optical axes of the respective semiconductor laser devices 110 and 210. More specifically, a total of 16 regions 517 are formed on each of the positive and negative y sides of mirror 510.

Second reflective mirror 520 is disposed diagonally (at an incidence angle of 45° in the present exemplary embodiment) with respect to the light emitted from third and fourth laser light source units 300, 400. Mirror 52 has reflective regions 527 (the regions grayed in FIG. 3B and not shown in FIG. 3A) at which incident light is reflected, and transmissible regions 528, which allow incident light to pass through them. Reflective regions 527 straddle the optical axes of the respective semiconductor laser devices 310 and 410. More specifically, a total of 16 regions 527 are formed on each of the positive and negative y sides of mirror 520.

As shown in FIGS. 3A and 3B, reflective regions 517 on the positive y side of mirror 510 and reflective regions 527 on the positive y side of mirror 520 are located on the same position in the y direction and are displaced from each other in the z direction by half of the pitch at which semiconductor laser light sources 130, 230, 330, and 430 are arranged. This holds true for the relation between reflective regions 517 on the negative y side of mirror 510 and reflective regions 527 on the negative y side of mirror 520.

Light fluxes 131 from first laser light source unit 100 are reflected at reflective regions 517 on the positive y side of mirror 510 and emitted in the negative x direction.

Light fluxes 231 from second laser light source unit 200 are reflected at reflective regions 517 on the negative y side of mirror 510, pass through transmissible regions 528 of mirror 520, and strike first prisms 610. Thus, mirror 520 is disposed upstream of first prisms 610 at which the laser light fluxes emitted from unit 200 are reflected by mirror 510 arrive. After striking first prisms 610, light fluxes 231 are reflected twice in first prisms 610, namely by first reflection plane 611 and second reflection plane 612. Thus, the incident light fluxes are reflected such that their optical axes are parallelly displaced in the y direction to the positions passing through transmissible regions 518 and 528, respectively, of mirrors 510 and 520. After being reflected by first prisms 610, light fluxes 231 pass through transmissible regions 528 of mirror 520 and then transmissible regions 518 of mirror 510.

As shown in FIG. 3A, after passing through mirror 510, light fluxes 231 are displaced in the negative y direction from light fluxes 131 that have been emitted from first laser light source unit 100 and reflected at reflective regions 517 of mirror 510 by half of the pitch at which semiconductor laser light sources 130, 230, 330, and 430 are arranged.

The laser light fluxes from first laser light source unit 100 and the laser light fluxes from second laser light source unit 200 are combined in a manner as follows. The optical paths along which the laser light fluxes from unit 100 propagate after being reflected by mirror 510 are parallel to and in the same direction of travel as the optical paths along which the laser light fluxes from unit 200 propagate after being reflected by mirror 510 and first prisms 610.

Light fluxes 331 from third laser light source unit 300 are reflected at reflective regions 527 on the positive y side of second reflective mirror 520 and pass through transmissible regions 518 of first reflective mirror 510. As shown in FIG. 3B, light fluxes 331 are displaced from light fluxes 131 that have been emitted from first laser light source unit 100 and reflected at reflective regions 517 of mirror 510 by a half pitch in the positive z direction.

Light fluxes 431 from fourth laser light source unit 400 are reflected at reflective regions 527 on the negative y side of mirror 520 and strike first prisms 610. After striking prisms 610, light fluxes 431 are reflected twice in prisms 610, namely by first reflection plane 611 and second reflection plane 612. Thus, the incident light fluxes are reflected such that their optical axes are parallelly displaced in the y direction to the positions passing through transmissible regions 518 and 528, respectively, of mirror 510 and 520. After being reflected by prisms 610, light fluxes 431 pass through transmissible regions 528 of mirror 520 and then transmissible regions 518 of mirror 510.

As shown in FIG. 3A, after passing through mirror 510, light fluxes 431 are displaced in the negative y direction from light fluxes 331 that have been emitted from third laser light source unit 300 and reflected at reflective regions 527 of mirror 520 by half of the pitch at which semiconductor laser light sources 130, 230, 330, and 430 are arranged. As shown in FIG. 3B, light fluxes 431 are displaced from light fluxes 231 that have been emitted from second laser light source unit 200 and passed through mirror 510 by a half pitch in the positive z direction.

The laser light fluxes from third laser light source unit 300 and the laser light fluxes from fourth laser light source unit 400 are combined in a manner as follows. The optical paths along which the laser light fluxes from unit 300 propagate after being reflected by mirror 520 are parallel to and in the same direction of travel as the optical paths along which the laser light fluxes from unit 400 propagate after being reflected by mirror 520 and first prisms 610.

Thus, first to fourth laser light source units 100, 200, 300, 400 composing light source device 3 are disposed such that the light fluxes emitted from these units are combined to have four times the density of the light fluxes emitted from a single unit.

Fourth Exemplary Embodiment

Figure 4A:
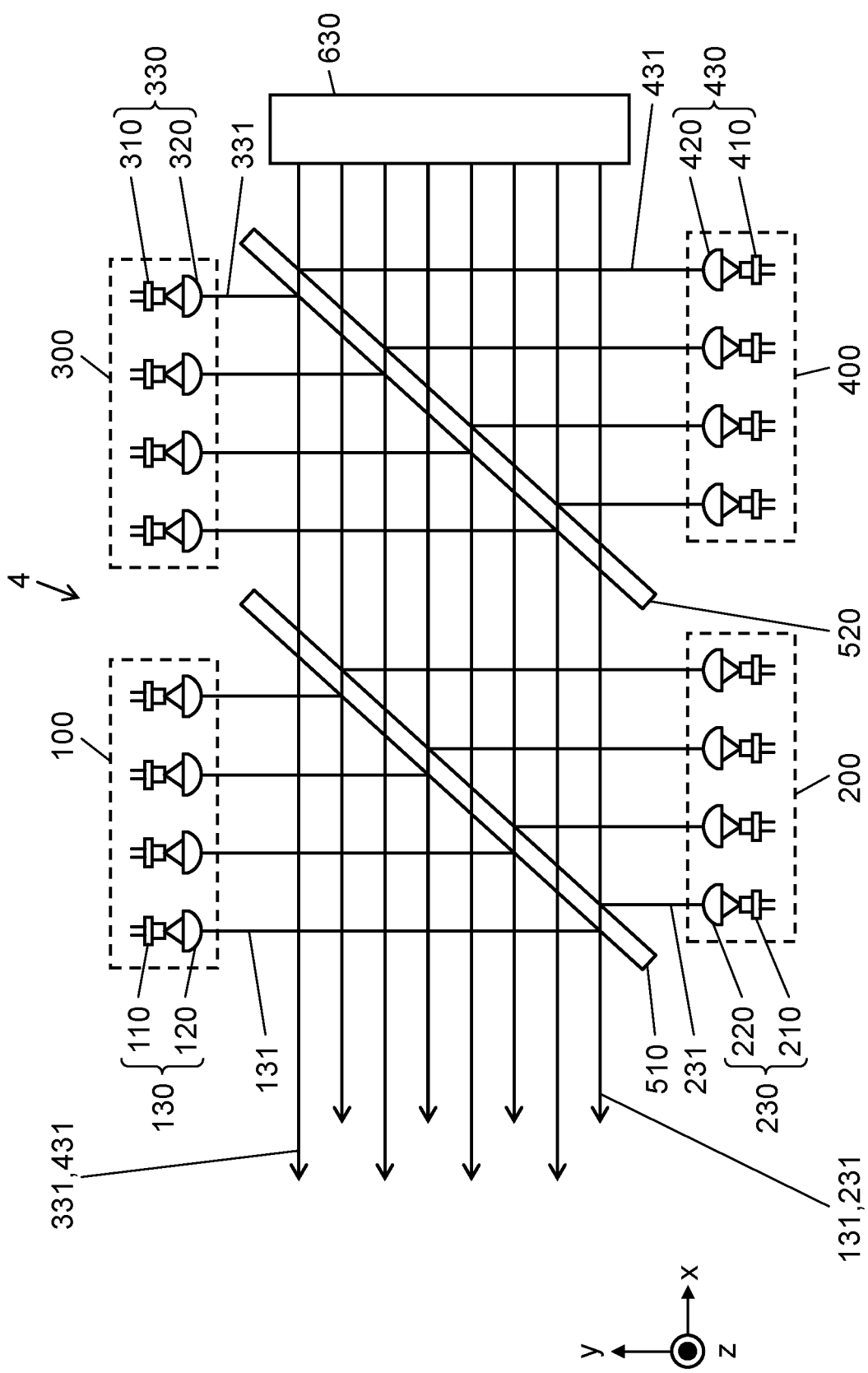
FIG. 4A is a top view of a light source device according to a fourth exemplary embodiment.

FIGS. 4A and 4B show the configuration of light source device 4 of the fourth exemplary embodiment. FIG. 4A shows the configuration of device 4 seen from above. FIG. 4B shows the configuration of device 4 seen from a side (in the y direction of FIG. 4A). In FIGS. 4A and 4B, like components are labeled with like reference numerals with respect to the third exemplary embodiment.

In FIG. 4A, light source device 4 includes first laser light source unit 100, second laser light source unit 200, third laser light source unit 300, fourth laser light source unit 400, first reflective mirror 510, second reflective mirror 520, and third prisms 630, each with two reflection planes: first reflection plane 631 and second reflection plane 632 at right angles to each other. First reflective mirror 510 is an example of the first reflective member. Second reflective mirror 520 is an example of the second reflective member. Third prisms 630 are an example of the returning reflective member with two reflection planes at right angles to each other. In the present exemplary embodiment, two third prisms 630 are disposed in the z direction.

The prisms used in the present exemplary embodiment are larger in size than those in the third exemplary embodiment. Furthermore, the spatial relationship between first to fourth laser light source units 100, 200, 300, 400 and mirrors 510, 520 in the present exemplary embodiment is different from the spatial relationship in the third exemplary embodiment. As will be described in detail later, as shown in FIG. 4B, first to fourth laser light source units are disposed such that their semiconductor laser light sources 130, 230, 330, and 430 are aligned in height (in the z direction). The laser light fluxes from laser light sources 130, 230, 330, and 430 that are in the upper two tiers in first to fourth laser light source units strike and are reflected by the upper prism 630, whereas the laser light fluxes from laser light sources 130, 230, 330, and 430 that are in the lower two tires in first to fourth laser light source units strike and are reflected by the lower prism 630.

In the fourth exemplary embodiment, semiconductor laser devices 110, 210, 310, and 410 are disposed such that light fluxes 131, 231, 331, and 431 have a divergence angle larger in the x direction than in the z direction, unlike the third exemplary embodiment.

First reflective mirror 510 is disposed diagonally (at an incidence angle of 45° in the present exemplary embodiment) with respect to the light emitted from first and second laser light source units 100, 200. Mirror 501 has reflective regions 517 (the regions grayed in FIG. 4B and not shown in FIG. 4A) at which incident light is reflected, and transmissible regions 518, which allow incident light to pass through them. Reflective regions 517 straddle the optical axes of the respective semiconductor laser devices 110 and 210. More specifically, a total of 16 regions 517 are formed on each of the positive and negative y sides of mirror 510.

Second reflective mirror 520 is disposed diagonally (at an incidence angle of 45° in the present exemplary embodiment) with respect to the light emitted from third and fourth laser light source units 300, 400. Mirror 520 has reflective regions 527 (the regions grayed in FIG. 4B) at which incident light is reflected, and transmissible regions 528, which allow incident light to pass through them. Reflective regions 527 straddle the optical axes of the respective semiconductor laser devices 310 and 410. More specifically, a total of 16 regions 527 are formed on each of the positive and negative y sides of mirror 520.

As shown in FIGS. 4A and 4B, reflective regions 517 on the positive y side of mirror 510 and reflective regions 527 on the positive y side of mirror 520 are located on the same position in the z direction and are displaced from each other in the y direction by a half pitch. This holds true for the relation between reflective regions 517 on the negative y side of mirror 510 and reflective regions 527 on the negative y side of mirror 520.

Light fluxes 131 from first laser light source unit 100 are reflected at reflective regions 517 on the positive y side of mirror 510 and emitted in the negative x direction.

Light fluxes 231 from second laser light source unit 200 are reflected at reflective regions 517 on the negative y side of mirror 510, pass through transmissible regions 528 of mirror 520, and strike third prisms 630. After striking third prisms 630, light fluxes 231 are reflected twice in third prisms 630, namely by first reflection plane 631 and second reflection plane 632. Thus, the incident light fluxes are reflected such that their optical axes are parallelly displaced in the z direction to the positions passing through transmissible regions 518 and 528, respectively, of mirrors 510 and 520. After being reflected by third prisms 630, light fluxes 231 pass through transmissible regions 528 of mirror 520 and then transmissible regions 518 of mirror 510.

After passing through mirror 510, light fluxes 231 are displaced in the z direction from light fluxes 131 that have been emitted from first laser light source unit 100 and reflected at reflective regions 517 of mirror 510. In the fourth exemplary embodiment, as shown in FIG. 4B, light fluxes 231 are displaced in the positive z direction from light fluxes 131 by half of the pitch at which semiconductor laser light sources 130, 230, 330, and 430 are arranged.

Thus, the light fluxes emitted from second laser light source unit 200 are displaced in the positive z direction from the light fluxes emitted from first laser light source unit 100 by half of the pitch at which semiconductor laser light sources 130, 230, 330, and 430 are arranged. Thus, the laser light fluxes from unit 100 and the laser light fluxes from unit 200 are combined in a manner as follows. The optical paths along which the laser light fluxes from unit 100 propagate after being reflected by mirror 510 are parallel to and in the same direction of travel as the optical paths along which the laser light fluxes from unit 200 propagate after being reflected by mirror 510 and third prisms 630.

Light fluxes 331 from third laser light source unit 300 are reflected at reflective regions 527 on the positive y side of mirror 520 and pass through transmissible regions 518 of mirror 510. As shown in FIG. 4A, the optical paths of light fluxes 331 are displaced in the positive y direction by a half pitch from light fluxes 131 reflected at reflective regions 517 of mirror 510.

Light fluxes 431 from fourth laser light source unit 400 are reflected at reflective regions 527 on the negative y side of mirror 520 and strike third prisms 630. After striking third prisms 630, light fluxes 431 are reflected twice in third prisms 630, namely by first reflection plane 631 and second reflection plane 632. Thus, the incident light fluxes are reflected such that their optical axes are parallelly displaced in the z direction to the positions passing through transmissible regions 518 and 528, respectively, of mirrors 510 and 520. After being reflected by third prisms 630, light fluxes 431 pass through transmissible regions 528 of mirror 520 and then transmissible regions 518 of mirror 510.

As shown in FIG. 4B, after passing through mirror 510, light fluxes 431 are displaced in the z direction from light fluxes 331 that have been emitted from third laser light source unit 300 and reflected at reflective regions 527 of mirror 520. As shown in FIG. 4A, light fluxes 431 are displaced in the positive y direction by a half pitch from light fluxes 231 that have been emitted from second laser light source unit 200 and passed through mirror 510.

Thus, the light fluxes emitted from fourth laser light source unit 400 are displaced in the positive z direction from the light fluxes emitted from third laser light source unit 300 by half of the pitch at which semiconductor laser light sources 130, 230, 330, and 430 are arranged. Thus, the laser light fluxes from unit 300 and the laser light fluxes from unit 400 are combined in a manner as follows. The optical paths along which the laser light fluxes from unit 300 propagate after being reflected by mirror 520 are parallel to and in the same direction of travel as the optical paths along which the laser light fluxes from unit 400 propagate after being reflected by mirror 520 and third prisms 630.

Thus, in the same manner as in the third exemplary embodiment, first to fourth laser light source units 100, 200, 300, 400 composing light source device 4 are disposed such that the light fluxes emitted from these units are combined to have four times the density of the light fluxes emitted from a single unit.

Fifth Exemplary Embodiment

Figure 5:
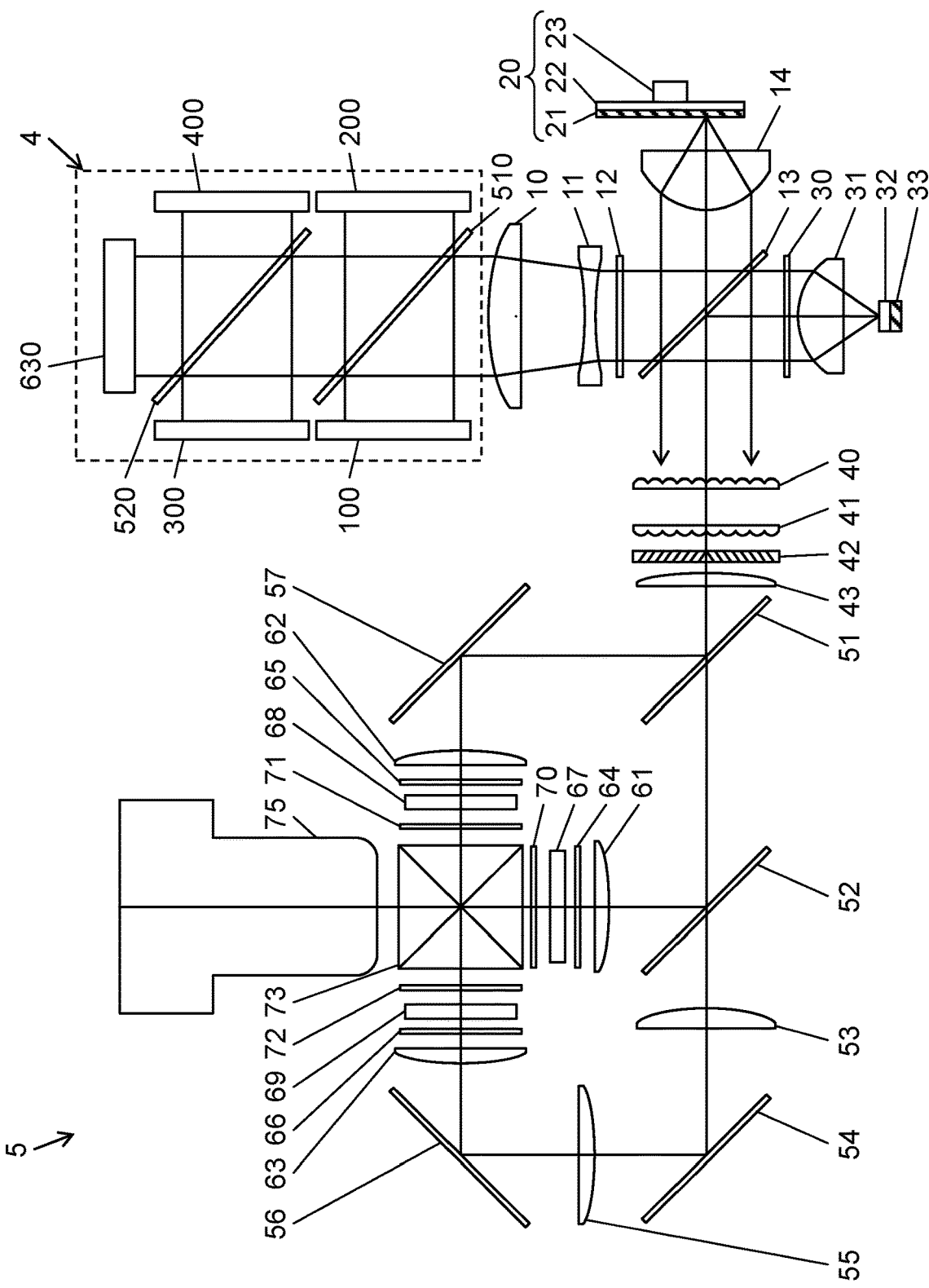
FIG. 5 shows a projection display apparatus according to a fifth exemplary embodiment.

FIG. 5 shows the configuration of projection display apparatus 5 including light source device 4 of the fourth exemplary embodiment.

Apparatus 5 includes, as image forming elements, active-matrix, twisted nematic (TN) or vertical alignment (VA) mode transmission liquid crystal panels with thin-film transistors in the pixel region.

Light source device 4 includes first, second, third, and fourth laser light source units 100, 200, 300, 400; first reflective mirror 510; second reflective mirror 520; and third prisms 630. These components are the same as those in light source device 4 of the fourth exemplary embodiment of the present disclosure; their description will not be repeated. In the fifth exemplary embodiment, the semiconductor laser devices are composed of blue semiconductor lasers, and light source device 4 emits blue light.

Projection display apparatus 5 of the fifth exemplary embodiment includes the following components: lens 10; lens 11; diffuser 12; dichroic mirror 13; condenser lens 14; phosphor substrate 20 composed of motor 23 and aluminum substrate 22, which has a reflective coating and phosphor layer 21; quarter wavelength plate 30; condenser lens 31; diffusion layer 32; reflector 33; first lens array plate 40; second lens array plate 41; polarization conversion element 42; and superimposing lens 43. These components and light source device 4 together form a lighting apparatus. Apparatus 5 further includes the following components: blue-reflection dichroic mirror 51; green-reflection dichroic mirror 52; reflective mirrors 54, 56, and 57; relay lenses 53 and 55; field lenses 61, 62, and 63; incidence-side polarizing plates 64, 65, and 66; liquid crystal panels 67, 68, and 69; existing-side polarizing plates 70, 71, and 72; color combining prism 73 composed of a red-reflection dichroic mirror and a blue-reflection dichroic mirror; and projection lens 75. Liquid crystal panels 67, 68, and 69 are an example of the optical modulator element. The optical paths leading from lens 10 to incidence-side polarizing plates 64, 65, and 66 are light guide sections for guiding the light fluxes from light source device 4 to the regions to be illuminated (including the light-incident surface of liquid crystal panels 67, 68, and 69). Liquid crystal panels 67, 68, and 69 are disposed in the regions to be illuminated.

The light fluxes from light source device 4 are collected by lens 10, returned to approximately parallel light fluxes by lens 11, and pass through diffuser 12. Diffuser 12, which is made of glass, diffuses light on its surface with microscopic asperities. Dichroic mirror 13 is a light separation element for separating the light fluxes that have passed through diffuser 12 into two directions.

Dichroic mirror 13 has a cut-off wavelength which is approximately the same as the wavelength of the blue light emitted from light source device 4. Mirror 13 has high reflectance for s-polarized light and, high transmittance for p-polarized light of the light emitted from light source device 4. Mirror 13 also allows green and red light to pass through it.

The s-polarized components of the light fluxes that have passed through diffuser 12 are reflected by dichroic mirror 13, collected on phosphor layer 21 by condenser lens 14, and excite phosphor layer 21. Diffuser 12 diffuses light such that the spotlight focused on the phosphor layer has a desired diameter.

Phosphor substrate 20 is composed of phosphor layer 21, aluminum substrate 22, and motor 23. Phosphor layer 21 is ring-shaped and formed on the rotation-controllable circular aluminum substrate 22 with motor 23. Phosphor layer 21 is made of a Ce-doped YAG yellow phosphor, which is excited by blue light and emits yellow light containing green and red components. This phosphor has a crystal matrix whose typical chemical composition is $Y_3Al_5O_{12}$.

Phosphor substrate 20 can be rotated to prevent phosphor layer 21 from being heated by the excitation light. This maintains high fluorescence conversion efficiency.

The green and red fluorescence generated in phosphor layer 21 strikes condenser lens 14 whereas the light generated on the reflective coating is reflected by the reflective coating and then strikes condenser lens 14. The generated fluorescence is converted to approximately parallel light by condenser lens 14 and then passes through dichroic mirror 13.

Meanwhile, the p-polarized components of the light that has passed through diffuser 12 pass through dichroic mirror 13. After passing through dichroic mirror 13, the p-polarized components pass through quarter wavelength plate 30 and are collected on diffusion layer 32 by condenser lens 31. Diffusion layer 32 is a thin glass with a surface with microscopic asperities. Reflector 33 is, for example, a dielectric film or an aluminum reflective coating. Diffusion layer 32 can diffuse incident light to equalize the light intensity distribution and to eliminate speckle noise of laser light.

The light illuminated on diffusion layer 32 is diffused by diffusion layer 32, reflected by reflector 33, converted to a parallel light flux by condenser lens 31, converted to s-polarized light while passing through quarter wavelength plate 30, and reflected by dichroic mirror 13. As a result, the blue light flux reflected by dichroic mirror 13 is combined with red and green light fluxes that have been generated in phosphor layer 21 and passed through dichroic mirror 13, thereby turning into white light.

The white light generated by dichroic mirror 13 strikes first lens array plate 40 composed of a plurality of lens elements. The light flux incident on first lens array plate 40 is separated into a large number of light fluxes. The separated light fluxes are converged on second lens array plate 41 composed of a plurality of lenses. The lens elements of first lens array plate 40 are disposed such that they together form an opening in the same manner as the case of liquid crystal panels 67, 68, and 69. The lens elements of second lens array plate 41 have a focal length determined to approximately conjugate first lens array plate 40 with liquid crystal panels 67, 68, and 69. The light from second lens array plate 41 strikes polarization conversion element 42. Element 42, which is composed of a polarization separation prism and a half-wavelength plate, converts natural light emitted from phosphor layer 21 into light polarized in one direction. Fluorescence, which is natural light, is polarized in one direction, whereas blue light, which strikes as s-polarized light, is converted to p-polarized light. The light from polarization conversion element 42 strikes superimposing lens 43. Lens 43 is used to superimpose the light fluxes emitted from the lens elements of second lens array plate 41 onto liquid crystal panels 67, 68, and 69.

The light from superimposing lens 43 is separated into blue, green, and red light by blue-reflection dichroic mirror 51 and green-reflection dichroic mirror 52, which are color separation elements. The green light passes through field lens 61 and incidence-side polarizing plate 64, and strikes liquid crystal panel 67. The blue light is reflected by reflective mirror 57, passes through field lens 62 and incidence-side polarizing plate 65, and strikes liquid crystal panel 68. The red light refracts and passes through relay lenses 53, 55 and reflected by reflective mirrors 54, 56, passes through field lens 63 and incidence-side polarizing plate 66, and strikes liquid crystal panel 69.

Liquid crystal panels 67, 68, and 69 change the polarization state of the incident light by controlling, according to a video signal, the voltage applied to the pixels. Panel 67 modulates light and generates a green image through polarizing plates 64 and 70 disposed at right angles to the transmission axis. Panel 68 modulates light and generates a blue image through polarizing plates 65 and 71 disposed at right angles to the transmission axis. Panel 69 modulates light and generates a red image through polarizing plates 66 and 72 disposed at right angles to the transmission axis. The red and blue light that has passed through polarizing plates 71 and 72 is reflected by the red-reflection dichroic mirror and the blue-reflection dichroic mirror, respectively, of color combining prism 73 and is combined with the green light that has passed through polarizing plate 70, and strikes projection lens 75. The light incident on lens 75 is projected on a screen (not shown) in an enlarged scale.

As described in the fourth exemplary embodiment, light source device 4 of the fifth exemplary embodiment has a high density of emitted laser light fluxes. Device 4 is an indispensable component in a long-life high-luminance projection display apparatus miniaturized by using a plurality of solid-state light sources. Furthermore, the projection display apparatus includes, as image forming elements, three liquid crystal panels that are not based on time sharing but use polarization. With this feature, the apparatus can produce bright high definition projection images with high color reproducibility and no color breaking phenomenon. Unlike the case of using three digital micromirror devices (DMDs), the projection display apparatus does not need a total reflecting prism. Furthermore, the incidence angle of the color combining prism used in the apparatus is only 45 degrees. These features enable the apparatus to be smaller than in the case of using three DMDs.

The projection display apparatus includes transmission liquid crystal panels as image forming elements; alternatively, however, the panels may be reflective ones so that the apparatus can be smaller in size and have higher definition.

The light sources used in the fifth exemplary embodiment are the blue laser light sources and phosphors; however, it is alternatively possible to use red, green, and blue laser light sources so that the apparatus has a wider color gamut.

Sixth Exemplary Embodiment

Figure 6:
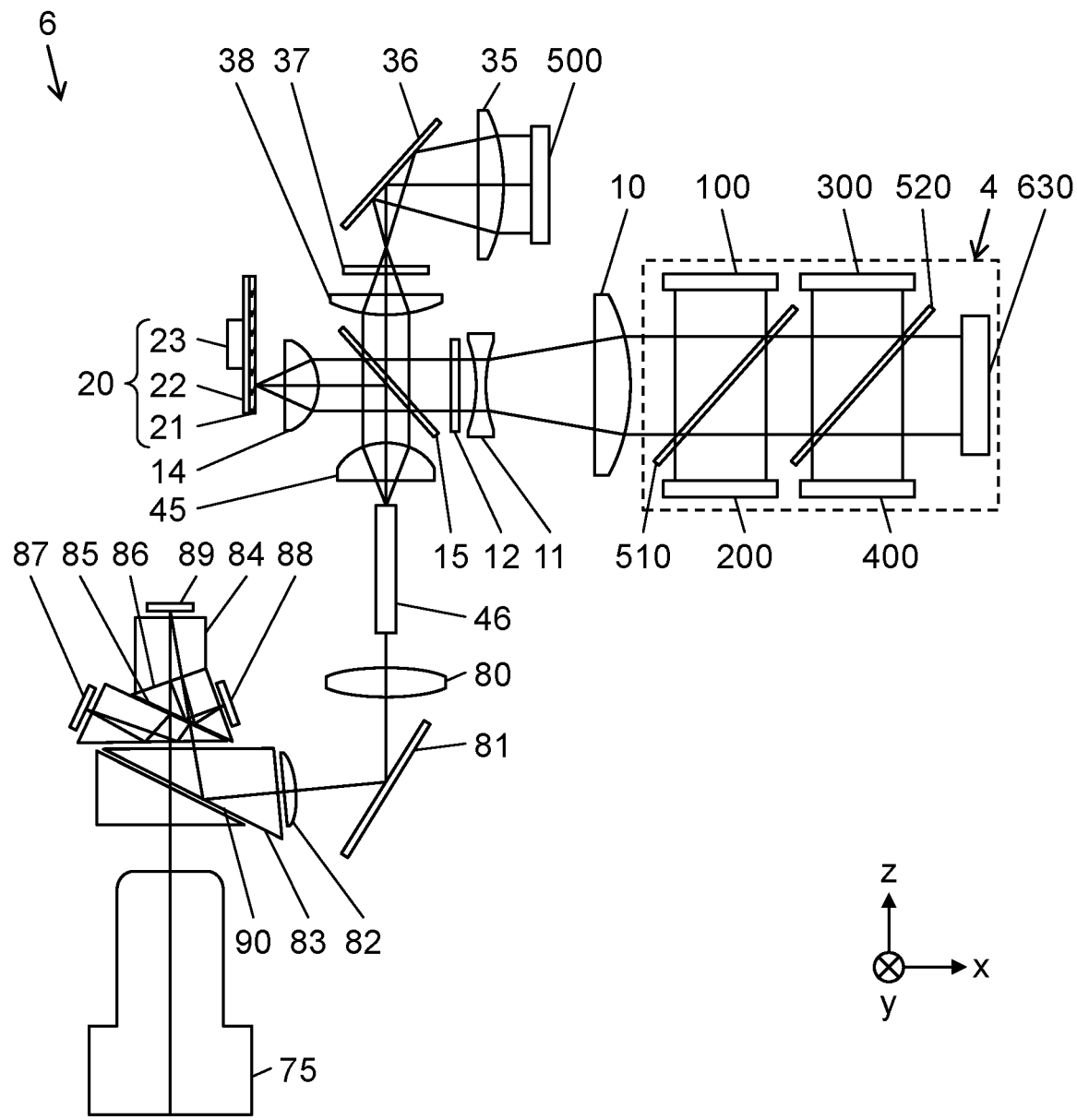
FIG. 6 shows a projection display apparatus according to a sixth exemplary embodiment.

FIG. 6 shows the configuration of second projection display apparatus 6 of the sixth exemplary embodiment of the present disclosure. Apparatus 6 includes three digital micromirror devices (DMDs) as image forming elements.

Light source device 4 includes first, second, third, and fourth laser light source units 100, 200, 300, 400; first reflective mirror 510; second reflective mirror 520; and third prisms 630. These components are the same as those in light source device 4 of the fourth exemplary embodiment of the present disclosure; their description will not be repeated. In the sixth exemplary embodiment, the semiconductor laser devices are composed of blue semiconductor lasers, and light source device 4 emits blue light.

Projection display apparatus 6 of the sixth exemplary embodiment includes the following components: lens 10; lens 11; diffuser 12; dichroic mirror 15; condenser lens 14; phosphor substrate 20; fifth laser light source unit 500; lens 35; reflective mirror 36; diffuser 37; lens 38; collection lens 45; rod 46; relay lens 80; and reflective mirror 81. These components and light source device 4 together form a lighting apparatus. Phosphor substrate 20 is composed of motor 23 and aluminum substrate 22, which has a reflective coating and phosphor layer 21. Apparatus 6 further includes the following components: field lens 82, total reflecting prism 83, color prism 84, DMDs 87, 88, and 89, and projection lens 75. DMDs 87, 88, and 89 are another example of the optical modulator element. The optical paths leading from lens 10 to color prism 84 are light guide sections for guiding the light fluxes from light source device 4 to the regions to be illuminated (the light-incident surface of DMDs 87, 88, and 89). DMDs 87, 88, and 89 are disposed in the regions to be illuminated.

The light fluxes from light source device 4 are collected by lens 10, returned to approximately parallel light fluxes by lens 11, and pass through diffuser 12. Diffuser 12, which is made of glass, diffuses light on its surface with microscopic asperities.

Dichroic mirror 15 allows the blue light from light source device 4 to pass through it, while reflecting red and green light.

After being emitted from light source device 4 and passing through diffuser 12, the light fluxes pass through dichroic mirror 15, are collected on phosphor layer 21 by condenser lens 14, and excite phosphor layer 21. Diffuser 12 diffuses light such that the spotlight focused on the phosphor layer has a desired diameter.

Phosphor substrate 20 is composed of phosphor layer 21, aluminum substrate 22, and motor 23. Phosphor layer 21 is ring-shaped and formed on the rotation-controllable circular aluminum substrate 22 with motor 23. Phosphor layer 21 is made of a Ce-doped YAG yellow phosphor, which is excited by blue light and emits yellow light containing green and red components. This phosphor has a crystal matrix whose typical chemical composition is $Y_3Al_5O_{12}$.

Phosphor substrate 20 can be rotated to prevent phosphor layer 21 from being heated by the excitation light. This maintains high fluorescence conversion efficiency.

The green and red fluorescence generated in phosphor layer 21 strikes condenser lens 14 whereas the light emitted from the reflective coating is reflected by the reflective coating and then strikes condenser lens 14. The generated fluorescence is converted to approximately parallel light by condenser lens 14 and then reflected by dichroic mirror 15.

Like first to fourth laser light source units 100 to 400, fifth laser light source unit 500 includes four semiconductor laser light sources arranged in a 2-D, 2×2 array at regular intervals. Each of the light sources is composed of a blue semiconductor laser device and a collection lens. The light fluxes emitted from unit 500 are collected by lens 35, reflected by reflective mirror 36, pass through diffuser 37, and converted to approximately parallel light by lens 38. Diffuser 37, which is made of glass, diffuses light on its surface with microscopic asperities. Diffuser 37 can diffuse incident light to equalize the light intensity distribution and to eliminate speckle noise of laser light.

The blue light emitted from unit 500 and returned to approximately parallel light by lens 38 passes through dichroic mirror 15 and is combined with red and green light from phosphor layer 21 and is turned into white light.

The white light generated by dichroic mirror 15 strikes collection lens 45 and is collected on rod 46. The light incident on rod 46 is reflected a plurality of times in the rod and emitted with an equalized light intensity distribution. The light from rod 46 is collected by relay lens 80, reflected by reflective mirror 81, passes through field lens 82 and strikes total reflecting prism 83. Total reflecting prism 83 is composed of two prisms and thin air layer 90 on the vicinal face of the two prisms. Air layer 90 totally reflects the light incident at a critical angle or a greater angle. The light from field lens 82 is reflected by the total reflection plane of total reflecting prism 83 and strikes color prism 84.

Color prism 84 is composed of three prisms; one of the vicinal faces of the prisms is provided with blue-reflection dichroic mirror 85 and the other is provided with red-reflection dichroic mirror 86. The light incident on color prism 84 is separated into blue, red, and green light by blue-reflection dichroic mirror 85 and red-reflection dichroic mirror 86 of color prism 84, and the color light strikes DMDs 87, 88, and 89. DMDs 87, 88, and 89 deflect the micromirrors according to a video signal such that part of the light strikes projection lens 75 and the other part is reflected by lens 75 to the outside of the effective diameter. After being reflected by DMDs 87, 88, and 89, the light passes through color prism 84 again. The blue, red, and green light is combined while passing through color prism 84, and strikes total reflecting prism 83. The light incident on total reflecting prism 83 strikes and passes through air layer 90 at a critical angle or a smaller angle, and then strikes projection lens 75. Finally, the image light generated by DMDs 87, 88, and 89 is projected on a screen (not shown) in an enlarged scale.

The light source device 4, which is composed of the plurality of solid-state light sources, emits white light with high efficiency and good white balance. Such a device is an indispensable component in a projection display apparatus with a long service life and high luminance. Using, as image forming elements, DMDs instead of liquid crystal panels makes the projection display apparatus more resistant to light and heat. Furthermore, using three DMDs allows the apparatus to produce bright high definition projection images with high color reproducibility.

The light sources used in the projection display apparatus are the blue laser light sources and phosphors; however, it is alternatively possible to use red, green, and blue laser light sources so that the apparatus has a wider color gamut.

INDUSTRIAL APPLICABILITY

The present disclosure relates to a projection display apparatus including optical modulator elements, such as liquid crystal panels and DMDs.

What is claimed is:

1. A light source device comprising:
    a first laser light source unit and a second laser light source unit disposed face-to-face, each of the first laser light source unit and the second laser light source unit comprising a plurality of laser light sources arranged in an array;
    a first reflective member configured to be disposed diagonally with respect to light emitted from the first laser light source unit and from the second laser light source unit, the first reflective member being configured to reflect the light; and
    a returning reflective member configured to reflect the light that is emitted from the second laser light source unit and is reflected by the first reflective member,
    wherein the light emitted from the first laser light source unit and reflected by the first reflective member is parallel to, and in a same direction of travel as, the light emitted from the second laser light source unit and reflected by the returning reflective member, and
    wherein at least part of the light emitted from the second laser light source unit and reflected by the returning reflective member is disposed between parts of the light emitted from the first laser light source unit and reflected by the first reflective member.

2. The light source device according to claim 1, wherein the first reflective member comprises a transmissible region, and
    the light emitted from the second laser light source unit and reflected by the returning reflective member passes through the transmissible region of the first reflective member.

3. The light source device according to claim 1, wherein the returning reflective member comprises a first reflection plane and a second reflection plane at right angles to each other.

4. The light source device according to claim 1, wherein the returning reflective member is a prism with two reflection planes at right angles to each other.

5. The light source device according to claim 1, wherein the returning reflective member comprises:
    two mirrors at right angles to each other; and
    a mechanism holding the two mirrors.

6. A projection display apparatus comprising:
    a light guide section configured to guide the light emitted from the light source device of claim 1 to a region to be illuminated;
    an optical modulator element disposed in the region to be illuminated, the optical modulator element being configured to modulate, under control of an external signal, the light guided to the region to be illuminated, and
    a projection lens configured to project the light modulated by the optical modulator element on a screen in an enlarged scale.

7. A light source device comprising:
    a first laser light source unit and a second laser light source unit disposed face-to-face, each of the first laser light source unit and the second laser light source unit comprising a plurality of laser light sources arranged in an array;
    a first reflective member configured to be disposed diagonally with respect to light emitted from the first laser light source unit and from the second laser light source unit, the first reflective member being configured to reflect the light;
    a third laser light source unit and a fourth laser light source unit disposed face-to-face, each of the third laser light source unit and the fourth laser light source unit comprising a plurality of laser light sources arranged in an array;

a second reflective member configured to be disposed diagonally with respect to light emitted from the third laser light source unit and from the fourth laser light source unit, the second reflective member being configured to reflect the light; and a returning reflective member configured to reflect the light that is emitted from the second laser light source unit and is reflected by the first reflective member, and the light that is emitted from the fourth laser light source unit and is reflected by the second reflective member, wherein following types of light are parallel to one another and in an identical direction of travel:
  the light emitted from the first laser light source unit and reflected by the first reflective member;
  the light emitted from the second laser light source unit and reflected by the returning reflective member;
  the light emitted from the third laser light source unit and reflected by the second reflective member; and
  the light emitted from the fourth laser light source unit and reflected by the returning reflective member, and the second reflective member is disposed on a path of the light from the first reflective member to the returning reflective member, the light being emitted from the second laser light source unit.

8. The light source device according to claim 7, wherein part of the light emitted from the second laser light source unit is disposed between parts of the light emitted from the first laser light source unit, and part of the light emitted from the fourth laser light source unit is disposed between parts of the light emitted from the third laser light source unit.

9. The light source device according to claim 7, wherein the first reflective member comprises a transmissible region, and the light emitted from the second laser light source unit and reflected by the returning reflective member passes through the transmissible region of the first reflective member.

10. The light source device according to claim 7, wherein the second reflective member comprises a transmissible region, and the light emitted from the fourth laser light source unit and reflected by the returning reflective member passes through the transmissible region of the second reflective member.

11. The light source device according to claim 7, wherein the first reflective member comprises a transmissible region, the second reflective member comprises a transmissible region, the light emitted from the second laser light source unit and reflected by the first reflective member and the light emitted from the second laser light source unit and reflected by the returning reflective member pass through the transmissible region of the second reflective member, and the light emitted from the fourth laser light source unit and reflected by the returning reflective member passes through the transmissible region of the first reflective member.

12. The light source device according to claim 7, wherein the returning reflective member comprises a first reflection plane and a second reflection plane at right angles to each other.

13. The light source device according to claim 7, wherein the returning reflective member is a prism with two reflection planes at right angles to each other.

14. The light source device according to claim 7, wherein the returning reflective member comprises:
  two mirrors at right angles to each other; and
  a mechanism holding the two mirrors.

15. A projection display apparatus comprising:
  a light guide section configured to guide the light emitted from the light source device of claim 7 to a region to be illuminated;
  an optical modulator element disposed in the region to be illuminated, the optical modulator element being configured to modulate, under control of an external signal, the light guided to the region to be illuminated, and
  a projection lens configured to project the light modulated by the optical modulator element on a screen in an enlarged scale.

* * * * *